United States Patent [19]

Misaizu et al.

[11] Patent Number: 5,487,089
[45] Date of Patent: Jan. 23, 1996

[54] NYQUIST FILTER FOR DIGITAL MODULATION

[75] Inventors: Kouei Misaizu, Kawasaki; Shoichiro Honda, Fukuoka; Hiroshi Ohnishi, Tokyo, all of Japan

[73] Assignee: Matsushita Electric Industrial Co., Ltd., Osaka, Japan

[21] Appl. No.: 16,222

[22] Filed: Feb. 11, 1993

[30] Foreign Application Priority Data

Feb. 17, 1992 [JP] Japan .................................... 4-028765
Jan. 14, 1993 [JP] Japan .................................... 5-004633

[51] Int. Cl.$^6$ .................................................. H04K 1/02
[52] U.S. Cl. ......................... 375/296; 375/229; 375/350; 364/724.16; 364/724.13
[58] Field of Search ................................. 375/60, 103, 14, 375/19, 229–232, 292, 296, 346, 348, 350; 364/724.01, 724.13, 724.16, 724.19, 724.2

[56] References Cited

U.S. PATENT DOCUMENTS

| | | | |
|---|---|---|---|
| 4,709,343 | 11/1987 | Van Cang | 364/724.01 |
| 4,755,773 | 7/1988 | Ohmagari | 375/60 |
| 4,843,581 | 6/1989 | Cupo et al. | 364/724.16 |
| 4,843,615 | 6/1989 | Davis | 375/60 |
| 5,005,184 | 4/1991 | Amano et al. | 375/14 |
| 5,117,385 | 5/1992 | Gee | 364/724.16 |
| 5,148,448 | 9/1992 | Karam et al. | 375/60 |
| 5,230,008 | 7/1993 | Duch et al. | 375/19 |
| 5,285,479 | 2/1994 | Iwane | 375/60 |

FOREIGN PATENT DOCUMENTS

1264307 10/1989 Japan .

*Primary Examiner*—Stephen Chin
*Assistant Examiner*—Amanda T. Le
*Attorney, Agent, or Firm*—Lowe, Price, LeBlanc & Becker

[57] ABSTRACT

An input bit sequence is converted into n-bit parallel symbol signals each representing one symbol. A shift register stores an "m" number of the n-bit parallel symbol signals, shifting the n-bit parallel symbol signals one symbol by one symbol and outputting them. At least one selector is operative for sequentially selecting one of the k-th symbol signal and the (m+1)−k-th symbol signal outputted by the shift register in response to a clock signal, where k equals $1, 2, \ldots, (m-1)/2$. A sampling counter serves to count pairs of successive clock pulses of the clock signal. An Exclusive-OR circuit executes Exclusive-OR operation between the clock signal and an output signal of the sampling counter. At least one first read-only memory stores data representing portions of predetermined impulse response waveforms, and outputs the data in response to an address signal having higher and lower parts. A second read-only memory stores data representing portions of predetermined impulse response waveforms, and outputs the data in response to an address signal having higher and lower parts. A filter output signal is generated by combining the data output by the first read-only memory and the second read-only memory.

5 Claims, 9 Drawing Sheets

FIG. 11

NYQUIST FILTER FOR DIGITAL MODULATION

BACKGROUND OF THE INVENTION

This invention relates to a Nyquist filter for digital modulation generating a digital modulation waveform signal such as a QPSK (quaternary phase shift keyed) signal, a π/4-shift QPSK signal, or a 16-QAM (16-value quadrature amplitude modulation) signal.

Some Nyquist filters for digital modulation include ROM's (read-only memories). In digital communication, it is essential to prevent intersymbol interference. Since Nyquist filters using ROM's can be easily made into filtering characteristics well suited to remove intersymbol interference, such Nyquist filters are widely used in digital communication.

As will be explained later, a prior art Nyquist filter has some problem.

SUMMARY OF THE INVENTION

It is an object of this invention to provide an improved Nyquist filter for digital modulation.

A first aspect of this invention provides a Nyquist filter for digital modulation which comprises a signal converter for converting an input bit sequence into n-bit parallel symbol signals each representing one symbol, where "n" denotes a given natural number; a shift register connected to the signal converter for storing an "m" number of the n-bit parallel symbol signals, for shifting the n-bit parallel symbol signals one symbol by one symbol, and for outputting the n-bit parallel symbol signals, where "m" denotes a given odd natural number equal to or greater than 3; a clock signal generator for generating a clock signal having a given frequency; at least one selector for sequentially selecting one of the k-th symbol signal and the (m+1)−k-th symbol signal outputted by the shift register in response to the clock signal, where k equals 1, 2, . . . , (m−1)/2; a sampling counter for counting pairs of successive clock pulses of the clock signal; an Exclusive-OR circuit for executing Exclusive-OR operation between the clock signal and an output signal of the sampling counter; at least one first read-only memory for storing data representing portions of predetermined impulse response waveforms which do not cause intersymbol interference, and for outputting the data in response to an address signal having a higher part constituted by an output signal of the selector and a lower part constituted by an output signal of the Exclusive-OR circuit; a second read-only memory for storing data representing portions of predetermined impulse response waveforms which do not cause intersymbol interference, and for outputting the data in response to an address signal having a higher part constituted by the (m+1)/2-th symbol signal outputted by the shift register and a lower part constituted by the output signal of the sampling counter; an adder for combining the data outputted by the first read-only memory and the second read-only memory; and a digital-to-analog converter for converting an output signal of the adder into a corresponding analog signal.

A second aspect of this invention provides a Nyquist filter for digital modulation which comprises a first ROM for storing data representing first portions of predetermined impulse response waveforms which do not cause intersymbol interference, wherein the predetermined impulse response waveforms have second portions and central portions different from the first portions thereof, and the first portions and the second portions of the predetermined impulse response waveforms are symmetrical with respect to the central portions thereof; a second ROM for storing data representing the central portions of the predetermined impulse response waveforms; first means for accessing the first ROM and the second ROM to read out the data from the first ROM and the second ROM in response to an input signal, and for generating first data according to the data read out from the first ROM and the second ROM, the first data representing first and central portions of impulse response waveforms corresponding to the input signal; second means for accessing the first ROM to read out the data from file first ROM in response to the input signal, for generating second data on the basis of the data read out from the first ROM, the second data representing second portions of impulse response waveforms corresponding to the input signal; and means for combining the first data generated by the first means and the second data generated by the second means.

DESCRIPTION OF THE PRIOR ART

Figure 1:
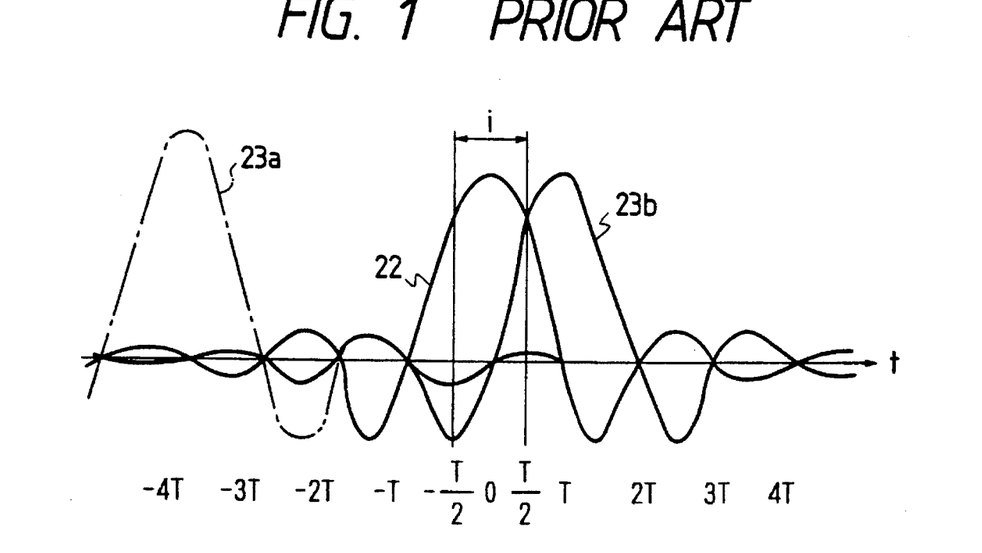
FIG. 1 is a diagram of impulse response waveforms of a prior art Nyquist filter for digital modulation.

FIG. 1 shows an example of the desired impulse response of a prior art Nyquist filter for digital modulation which is designed so as to prevent intersymbol interference. In FIG. 1, a waveform 22 denotes an impulse response regarding a symbol of interest which occurs at a certain moment, and waveforms 23a and 23b denote impulse responses regarding symbols preceding and following the symbol of interest. The impulse response waveforms 22, 23a, and 23b are designed so that they will not cause intersymbol interference. In FIG. 1, "T" denotes a symbol interval.

It is theoretically shown that the present impulse response waveform 22 is affected by an infinite number of impulse response waveforms including, for example, impulse response waveforms 23a and 23b, related to symbols other than the symbol of interest. As shown in FIG. 1, in one symbol interval "i", the impulse response waveform 22 for the symbol of interest is affected by an impulse response waveform of a far distant symbol such as the impulse response waveform 23a to only a small degree. Thus, it is sufficient to consider impulse response waveforms of only several symbols around the symbol of interest, and impulse response waveforms of other symbols can be ignored. A resultant impulse response waveform in one symbol interval "i" in FIG. 1 can be accurately estimated by combining the desired impulse response waveforms of the symbol of interest and several symbols around the symbol of interest.

Figure 2:
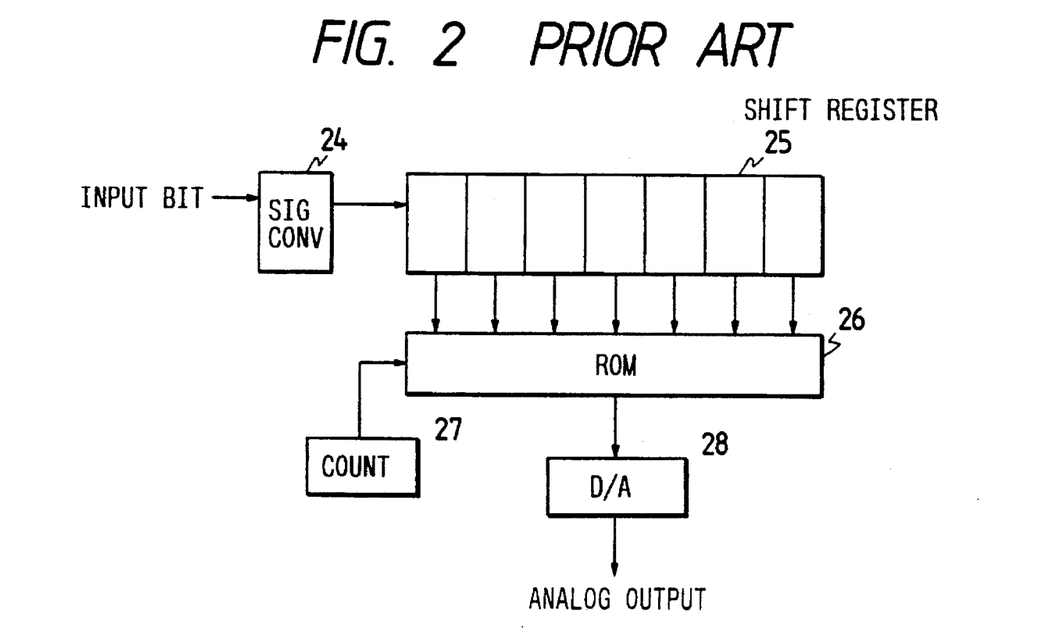
FIG. 2 is a block diagram of a prior art Nyquist filter for digital modulation.

The prior art Nyquist filter includes a ROM storing data representing a set of resultants of desired several-symbol impulse response waveforms in one symbol interval which are designed so as to prevent intersymbol interference. Addresses with respect to the ROM are defined as follows. A combination of symbols in the several-symbol interval is used as a higher-order address (higher address) to access the ROM, while the output signal of a counter for sampling a waveform in one symbol interval is used as a lower-order address (lower address) to access the ROM.

FIG. 2 is a block diagram of a prior art Nyquist filter for digital modulation. As shown in FIG. 2, the prior art Nyquist filter includes a signal converter 24. The signal converter 24 receives a string (sequence) of bits representing an input signal. The signal converter 24 subjects the input bit string signal to processing such as serial-to-parallel conversion or differential conversion, and thereby converts the input signal into a corresponding symbol. In the case of π/4-shift QPSK, three successive bits of the input signal compose one symbol. The symbol signal generated by the signal converter 24 is in an n-bit parallel form, where "n" denotes a given natural number equal to, for example, three. A shift register 25 following the signal converter 24 has seven segments connected in cascade. Each of the segments of the shift register 25 has "n" bits. Bits of an n-bit parallel symbol signal compose one n-bit group corresponding to one symbol. Successive n-bit parallel symbol signals are sequentially inputted and stored into the shift register 25 while being shifted through the segments of the shift register 25 one group by one group, that is, one symbol by one symbol. In addition, the segments of the shift register 25 output n-bit parallel symbol signals to a ROM 26 as a higher part of an address signal. The shift register 25 stores n×7 bits of the symbol signals.

In the prior art Nyquist filter of FIG. 2, the ROM 26 stores data representing a set of resultants of desired several-symbol impulse response waveforms in one symbol interval which are designed so as to prevent intersymbol interference. Addresses with respect to the ROM 26 are defined as follows. A combination of symbols in the several-symbol interval is used as a higher-order address (higher address) to access the ROM 26, while the output signal of a counter 27 for sampling a waveform in one symbol interval is used as a lower-order address (lower address) to access the ROM 26. The counter 27 has an "r" bits, where "r" denotes a given natural number equal to, for example, four. The counter 27 operates at a speed equal to "p" times a symbol clock speed, where "p" denotes a given natural number equal to, for example, sixteen. The counter 27 feeds a lower part of the address signal to the ROM 26. A digital-to-analog (D/A) converter 28 is connected to the ROM 26. The D/A converter 28 has an s-bit structure, where "s" denotes a given natural number corresponding to a quantization bit number equal to, for example, eight. The D/A converter 28 transforms output data of the ROM 26 into a corresponding analog signal. The output signal of the D/A converter 28 is a baseband signal fed to a modulator such as a π/4-shift QPSK or QAM modulator.

One of the resultants of the several-symbol impulse response waveforms, the information of which is stored in the ROM 26, is selected in response to the set of the seven symbol signals fed to the ROM 26 from the shift register 25. Data representing the time segments (samples) of the selected resultant waveform are sequentially read out from the ROM 26 in response to the output signal of the counter 27. This step corresponds to periodically sapling the selected resultant waveform. The data readout from the ROM 26 are sequentially transformed by the D/A converter 28 into the corresponding analog baseband signal. In this way, a symbol represented by the input signal is converted into a corresponding analog baseband signal for one symbol interval. These processes are reiterated for each symbol.

The prior art Nyquist filter of FIG. 2 has a problem in that the ROM 26 tends to require a large capacity.

DESCRIPTION OF THE FIRST PREFERRED EMBODIMENT

Figure 3:
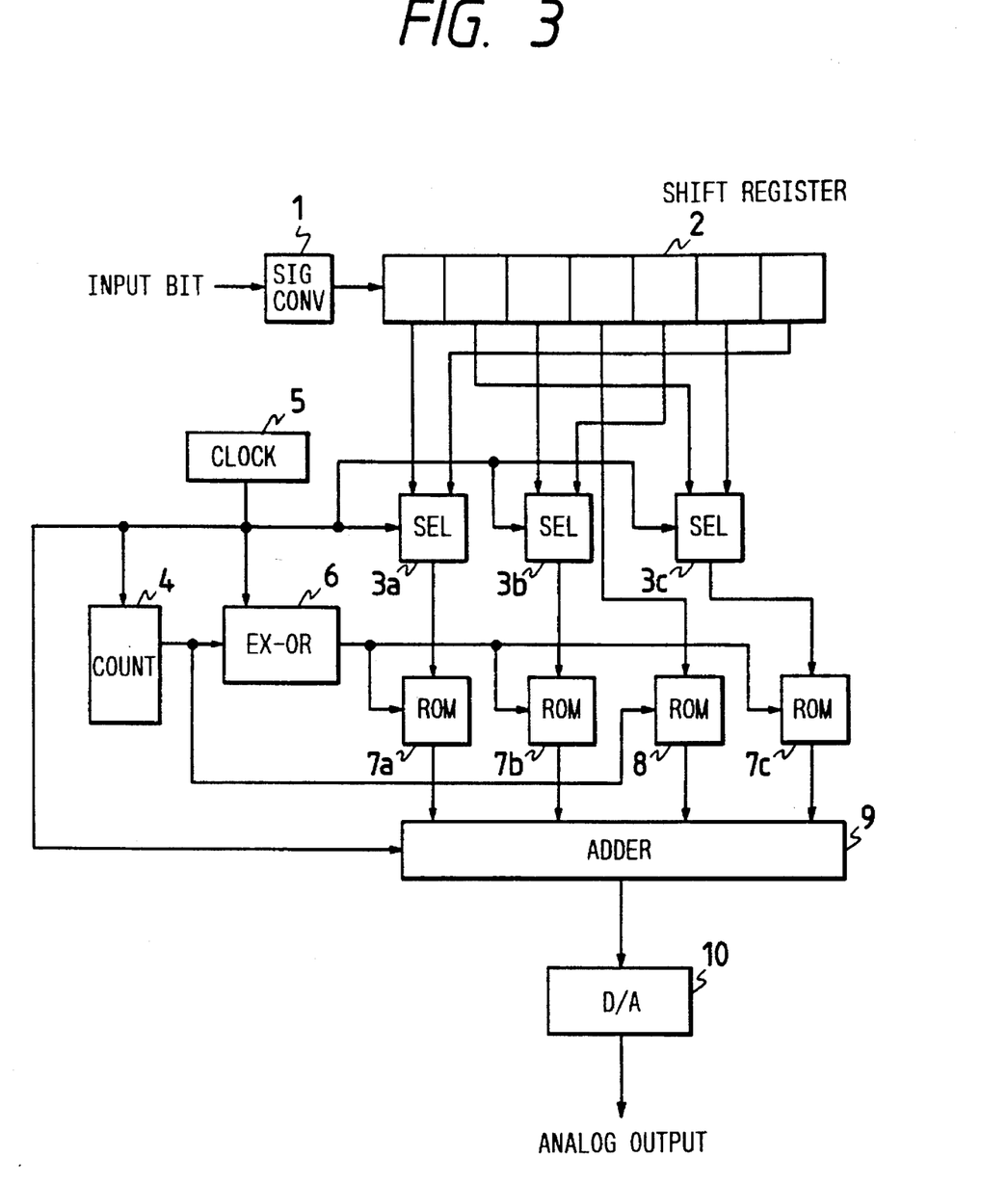
FIG. 3 is a block diagram of a Nyquist filter for digital modulation according to a first embodiment of this invention.

With reference to FIG. 3, a Nyquist filter for digital modulation includes a signal converter 1. The signal converter 1 receives a string (sequence) of bits representing an input signal. The signal converter 1 subjects the input bit string signal to processing such as serial-to-parallel conversion or differential conversion, and thereby converts the input signal into a corresponding symbol. In the case of π/4-shift QPSK, three successive bits of the input signal compose one symbol. The symbol signal generated by the signal converter 1 is in an n-bit parallel form, where "n" denotes a given natural number equal to, for example, three. A shift register 2 following the signal converter 1 has seven segments connected in cascade. It should be noted that the shift register 2 may have an odd number of segments other than seven. Each of the segments of the shift register 2 has "n" bits. Bits of an n-bit parallel symbol signal compose one n-bit group corresponding to one symbol. Successive n-bit parallel symbol signals are sequentially inputted and stored into the shift register 2 while being shifted through the segments of the shift register 2 one group by one group, that is, one symbol by one symbol. In addition, the segments of the shift register 2 output n-bit parallel symbol signals to subsequent devices which will be explained hereinafter.

A selector 3a receives the output symbol signals of the first and seventh segments of the shift register 2. The selector 3a selects one of the output symbol signals of the first and seventh segments of the shift register 2 in response to a clock signal fed from a clock signal generator 5, and transmits the selected symbol signal to a ROM 7a as a higher address signal. A selector 3b receives the output symbol signals of the third and fifth segments of the shift register 2. The selector 3b selects one of the output symbol signals of the third and fifth segments of the shift register 2 in response to the clock signal fed from the clock signal generator 5, and transmits the selected symbol signal to a ROM 7b as a higher address signal. A selector 3c receives the output symbol signals of the second and sixth segments of the shift register 2. The selector 3c selects one of the output symbol signals of the second and sixth segments of the shift register 2 in response to the clock signal fed from the clock signal generator 5, and transmits the selected symbol signal to a ROM 7c as a higher address signal. The output symbol signal of the fourth (central) segment of the shift register 2 is directly applied to a ROM 8 as a higher address signal.

Figure 4:
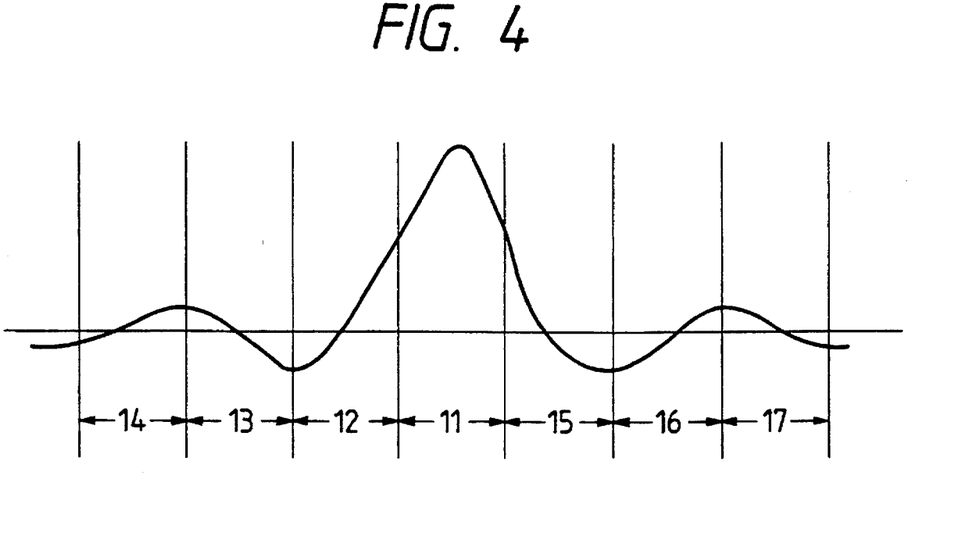
FIG. 4 is a diagram of an impulse response waveform of the Nyquist filter of FIG. 3.

FIG. 4 shows an example of a desired impulse response waveform designed so as to prevent intersymbol interference. As shown in FIG. 4, the impulse response waveform extends in seven successive symbol intervals 14, 13, 12, 11, 15, 16, and 17. The central symbol interval 11 relates to a symbol of interest. Three symbol intervals 14, 13, and 12 precede the central symbol interval 11. Three symbol intervals 15, 16, and 17 follow the central symbol interval 11. As shown in FIG. 4, the impulse response waveform is symmetrical with respect to the mid point of the central symbol interval 11. The time segments of the impulse response waveform in the symbol intervals 12 and 15 are symmetrical and similar to each other. The time segments of the impulse response waveform in the symbol intervals 13 and 16 are symmetrical and similar to each other. The time segments of the impulse response waveform in the symbol intervals 14 and 17 are symmetrical and similar to each other. By using the symmetry and similarity, it is possible to generate the impulse response waveform in the seven successive symbol intervals from only information of the time segments of the impulse response waveform in the symbol intervals 11, 12, 13, and 14. The ROM's 7a, 7b, 7c, and 8 store data representing the time segments of the impulse response waveform in the symbol intervals 14, 12, 13, and 11 respectively.

A sample value of the impulse response waveform which occurs at a time point (sampling point) "t" in the symbol interval 12 is now denoted by $SAMP_{12}(t)$. A sample value of the impulse response waveform which occurs at a time point "t" in the symbol interval 15 is now denoted by $SAMP_{15}(t)$. A sample value of the impulse response waveform which occurs at a time point "t" in the symbol interval 13 is now denoted by $SAMP_{13}(t)$. A sample value of the impulse response waveform which occurs at a time point "t" in the symbol interval 16 is now denoted by $SAMP_{16}(t)$. A sample value of the impulse response waveform which occurs at a time point "t" in the symbol interval 14 is now denoted by $SAMP_{14}(t)$. A sample value of the impulse response waveform which occurs at a time point "t" in the symbol interval 17 is now denoted by $SAMP_{17}(t)$. The symmetry and similarity provide the following relations.

$$SAMP_{12}(t)=SAMP_{15}(15-t) \quad (1)$$

$$SAMP_{13}(t)=SAMP_{16}(15-t) \quad (2)$$

$$SAMP_{14}(t)=SAMP_{17}(15-t) \quad (3)$$

It should be noted that the time point (sampling point) "t" is changeable among time-point-representing values "0", "1", "2", ..., "15".

A further description will now be given with respect to the impulse response waveform of FIG. 4. Corresponding impulse response waveforms related to symbols other than the symbol of interest are obtained by translating the impulse response waveform of the symbol of interest along a time base (a time axis). The impulse response waveform of the symbol preceding the symbol of interest by three symbol intervals has a segment in the present symbol interval which is equal to the segment of the impulse response waveform of the symbol of the interest extending in the symbol interval 17. The impulse response waveform of the symbol preceding the symbol of interest by two symbol intervals has a segment in the present symbol interval which is equal to the segment of the impulse response waveform of the symbol of the interest extending in the symbol interval 16. The impulse response waveform of the symbol immediately preceding the symbol of interest has a segment in the present symbol interval which is equal to the segment of the impulse response waveform of the symbol of the interest extending in the symbol interval 15. The impulse response waveform of the symbol following the symbol of interest by three symbol intervals has a segment in the present symbol interval which is equal to the segment of the impulse response waveform of the symbol of the interest extending in the symbol interval 14. The impulse response waveform of the symbol following the symbol of interest by two symbol intervals has a segment in the present symbol interval which is equal to the segment of the impulse response waveform of the symbol of the interest extending in the symbol interval 13. The impulse response waveform of the symbol immediately following the symbol of interest has a segment in the present symbol interval which is equal to the segment of the impulse response waveform of the symbol of the interest extending in the symbol interval 12. Thus, the segments of the impulse response waveforms of the symbol of interest and the symbols therearound, which extend in the present symbol interval, can be generated on the basis of the segments of the impulse response waveform in the symbol intervals 11, 12, 13, 14, 15, 16, and 17. By using the symmetry and similarity, the segments of the impulse response waveforms of the symbol of interest and the symbols therearound, which extend in the present symbol interval, can be generated on the basis of only the segments of the impulse response waveform in the symbol intervals 11, 12, 13, and 14. As described previously, the ROM's 7a, 7b, 7c, and 8 store data representing the time segments of the impulse response waveform in the symbol intervals 14, 12, 13, and 11 respectively.

The desired impulse response waveform is changed in accordance with a state of the symbol. In other words, there are provided a set of different desired impulse response waveforms predetermined for respective states of the symbol. All the desired impulse response waveforms have characteristics of symmetry such as previously mentioned. The ROM's 7a, 7b, 7c, and 8 store data representing the time segments of the impulse response waveforms in the symbol intervals 14, 12, 13, and 11 respectively.

Figure 5:
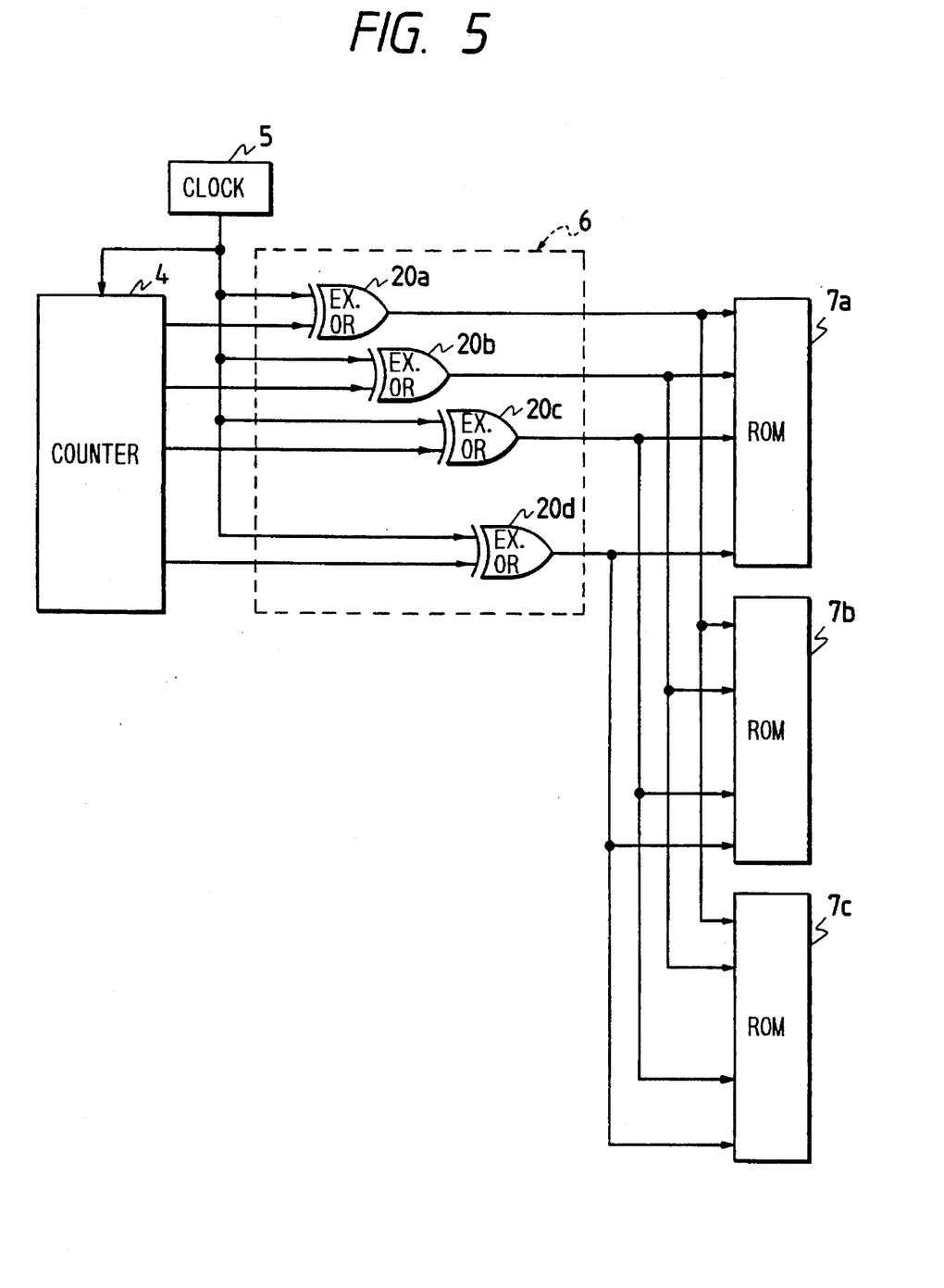
FIG. 5 is a block diagram of the Exclusive-OR circuit in the Nyquist filter of FIG. 3.

With reference to FIGS. 3 and 5, the clock signal generator 5 outputs the clock signal having a frequency equal to twice a predetermined sampling frequency. As previously described, the clock signal generator 5 feeds the clock signal to the selectors 3a, 3b, and 3c. In addition, the clock signal generator 5 feeds the clock signal to a counter 4 and an Exclusive-OR circuit 6.

The counter 4 includes a frequency divider halving the frequency of the clock signal and thereby generating a second clock signal (sampling clock signal) with a frequency equal to a half of the frequency of the original clock signal. The counter 4 counts pulses of the second clock signal, and outputs a signal representing the result of the pulse count. In other words, the counter 4 counts pairs of successive pulses of the clock signal fed from the clock signal generator 5. The output signal of the counter 4 is fed to the Exclusive-OR circuit 6. In addition, the output signal of the counter 4 is fed to the ROM 8 as a lower address signal. The output signal of the counter 4 has four bits sequentially and cyclically indicating one of time-point values "0", "1", "2", ..., "15".

As shown in FIG. 5, the Exclusive-OR circuit 6 includes Exclusive-OR gates 20a, 20b, 20c, and 20d. First input terminals of the Exclusive-OR gates 20a, 20b, 20c, and 20d receive the clock signal from the clock signal generator 5. Second input terminals of the Exclusive-OR gates 20a, 20b, 20c, and 20d receive the bits of the output signal of the counter 4 respectively. The output signals of the Exclusive-OR gates 20a, 20b, 20c, and 20d compose a 4-bit sampling clock signal fed to the ROM's 7a, 7b, and 7c as a lower address signal.

For example, when the output signal of the clock signal generator 5 is "0", the selectors 3a, 3b, and 3c select the output symbol signals of the first, third, and second segments of the shift register 2 which correspond to the symbols preceding the symbol of interest by three symbol intervals, one symbol interval, and two symbol intervals respectively. When the output signal of the clock signal generator 5 is "1", the selectors 3a, 3b, and 3c select the output symbol signals of the seventh, fifth, and sixth segments of the shift register 2 which correspond to the symbols following the symbol of interest by three symbol intervals, one symbol interval, and two symbol intervals respectively.

It is now assumed that, during a first half of the period for which the output signal of the counter 4 is "0000", the output signal of the clock signal generator 5 is "0". In this case, during the first half of the period, the selectors 3a, 3b, and 3c select the output symbol signals of the first, third, and second segments of the shift register 2 which correspond to the symbols preceding the symbol of interest by three symbol intervals, one symbol interval, and two symbol intervals respectively. In addition, the lower address signal outputted to the ROM's 7a, 7b, and 7c from the Exclusive-OR gates 20a, 20b, 20c, and 20d is "0000". When the first half of the period ends and a second half of the period starts, the output signal of the clock signal generator 5 changes from "0" to "1" but the output signal of the counter 4 remains "0000". Thus, during the second half of the period, the selectors 3a, 3b, and 3c select the output symbol signals of the seventh, fifth, and sixth segments of the shift register 2 which correspond to the symbols following the symbol of interest by three symbol intervals, one symbol interval, and two symbol intervals respectively. In addition, the lower address signal outputted to the ROM's 7a, 7b, and 7c from the Exclusive-OR gates 20a, 20b, 20c, and 20d is "1111". Thus, the previous relations (1), (2), and (3) are used, and the data representative of the impulse response waveforms in the symbol intervals 15, 16, and 17 is generated on the basis of the data representative of the impulse response waveforms in the symbol intervals 12, 13, and 14 which is stored in the ROM's 7a, 7b, and 7c.

Data are read out from the ROM's 7a, 7b, 7c, and 8 in response to address signals, the higher parts of which are fed from the selectors 3a, 3b, and 3c and the fourth segment of the shift register 2 while the lower parts of which are fed from the Exclusive-OR circuit 6 and the counter 4. The output data of the ROM's 7a, 7b, 7c, and 8 are combined by an adder 9 into a composite digital signal representing a time segment (sample) of a resultant of the 7-symbol impulse response waveforms. The digital signal outputted from the adder 9 is transformed by a D/A converter 10 into a corresponding analog baseband signal. As the lower parts of the address signals are periodically updated, the resultant of the 7-symbol impulse response waveforms for one symbol interval is generated and thus the corresponding analog baseband signal for one symbol interval is generated. These processes are reiterated for each symbol. The output baseband signal of the D/A converter 10 is fed to a modulator such as a π/4-shift QPSK or QAM modulator.

In the case of two-dimensional modulation (quadrature or orthogonal modulation) scheme, two sets of the ROM's 7a, 7b, 7c, and 8, the adder 9, and the D/A converter 10 are provided for an in-phase signal system and a quadrature signal system respectively.

For each of the in-phase signal system and the quadrature signal system, the total of necessary capacities of the ROM's 7a, 7b, 7c, and 8 is equal to $2^{15}$ bits in the case of π/4-shift QPSK. In the prior art Nyquist filter of FIG. 2, a corresponding necessary capacity of the ROM is $2^{33}$.

For each of the in-phase signal system and the quadrature signal system, the total of necessary capacities of the ROM's 7a, 7b, 7c, and 8 is equal to $2^{14}$ bits in the case of 16-QAM. In the prior art Nyquist filter of FIG. 2, a corresponding necessary capacity of the ROM is $2^{26}$.

Figure 6:
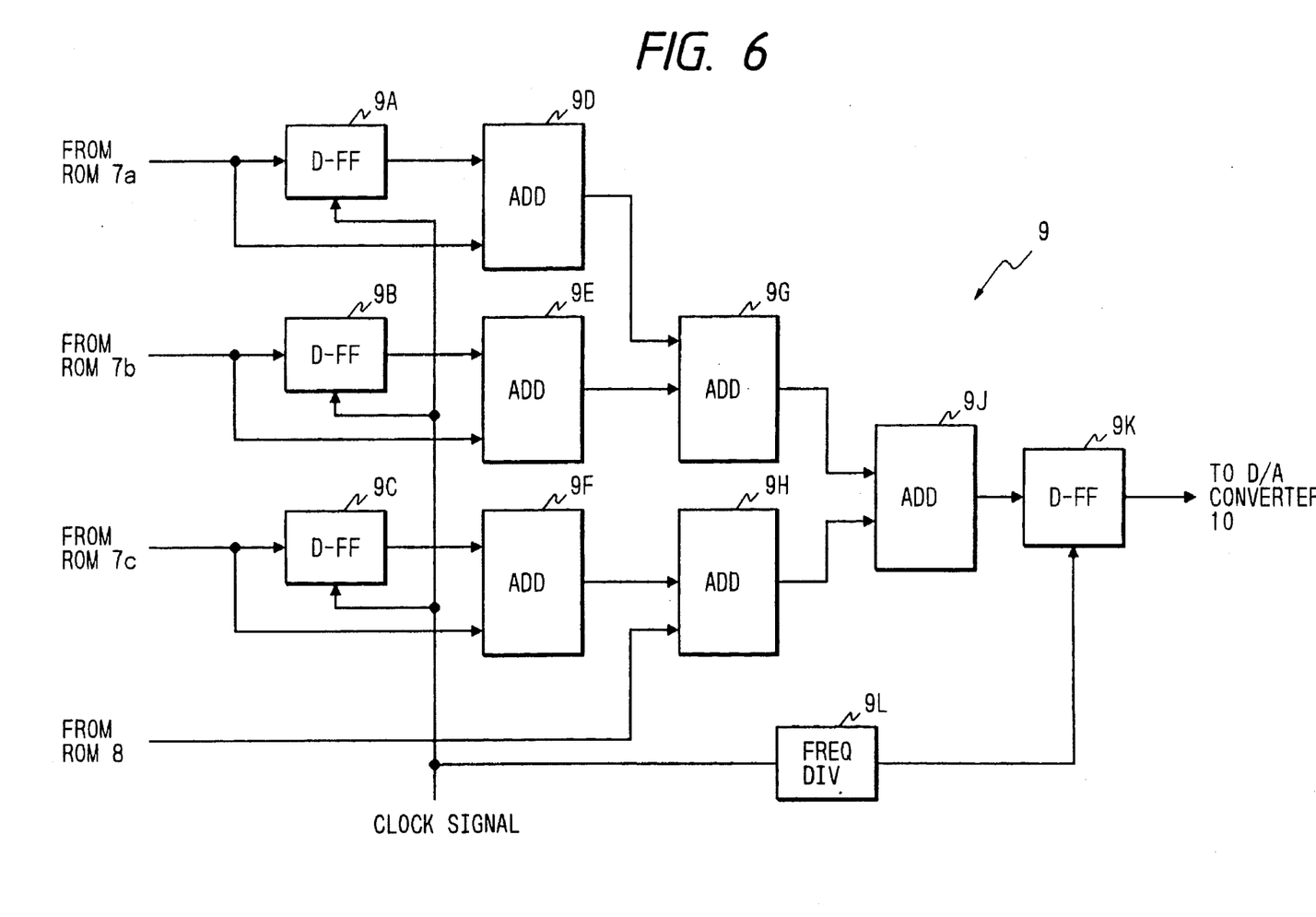
FIG. 6 is a block diagram of the adder in the Nyquist filter of FIG. 3.

As shown in FIG. 6, the adder 9 includes D flip-flops 9A, 9B, 9C, and 9K, adding elements 9D, 9E, 9F, 9G, 9H, and 9J, and a frequency divider 9L. The input terminal of the D flip-flop 9A receives the output signal of the ROM 7a. The D flip-flop 9A delays the output signal of the ROM 7a by one clock period in response to the clock signal fed from the clock signal generator 5. In this way, the delayed output signal of the ROM 7a is generated by the D flip-flop 9A. The delayed output signal of the ROM 7a and the non-delayed output signal of the ROM 7a are added by the adding element 9D. Specifically, the data representative of the waveforms responsive to the impulses in the symbol intervals preceding and following the present symbol interval by three symbol intervals are added by the adding element 9D. The input terminal of the D flip-flop 9B receives the output signal of the ROM 7b. The D flip-flop 9B delays the output signal of the ROM 7b by one clock period in response to the clock signal fed from the clock signal generator 5. In this way, the delayed output signal of the ROM 7b is generated by the D flip-flop 9B. The delayed output signal of the ROM 7b and the non-delayed output signal of the ROM 7b are added by the adding element 9E. Specifically, the data representative of the waveforms responsive to the impulses in the symbol intervals immediately preceding and following the present symbol interval are added by the adding element 9E. The input terminal of the D flip-flop 9C receives the output signal of the ROM 7c. The D flip-flop 9C delays the output signal of the ROM 7c by one clock period in response to the clock signal fed from the clock signal generator 5. In this way, the delayed output signal of the ROM 7c is generated by the D flip-flop 9C. The delayed output signal of the ROM 7c and the non-delayed output signal of the ROM 7c are added by the adding element 9F. Specifically, the data representative of the waveforms responsive to the impulses in the symbol intervals preceding and following the present symbol interval by two symbol intervals are added by the adding element 9F. The adding elements 9G, 9H, and 9J are connected and designed so as to add the output signals of the ROM 8 and the adding elements 9D, 9E, and 9F. Thus, the data representative of the waveforms responsive to the impulses in the present symbol interval and the symbol intervals therearound are added. The signal representing the addition result is outputted from the adding element 9J. The D flip-flop 9K gates the output signal of the adding element 9J in response to a gate signal having a frequency equal to a half of the frequency of the clock signal. The frequency divider 9L generates the gate signal from the clock signal through a frequency dividing process. The output signal of the D flip-flop 9K is fed to the D/A converter 10. In this way, the signal representing the addition result is transmitted to the D/A converter 10 via the D flip-flop 9K.

Generalizing this embodiment results in the following design. A generalized Nyquist filter for digital modulation includes a signal converter for converting an input bit sequence into n-bit parallel symbol signals each representing one symbol, where "n" denotes a given natural number; a shift register connected to the signal converter for storing an "m" number of the n-bit parallel symbol signals, for shifting the n-bit parallel symbol signals one symbol by one symbol, and for outputting the n-bit parallel symbol signals, where "m" denotes a given odd natural number equal to or greater than 3; a clock signal generator for generating a clock signal having a given frequency; at least one selector for sequentially selecting one of the k-th symbol signal and the (m+1)–k-th symbol signal outputted by the shift register in response to the clock signal, where k equals 1, 2, . . . , (m−1)/2; a sampling counter for counting pairs of successive clock pulses of the clock signal; an Exclusive-OR circuit for executing Exclusive-OR operation between the clock signal and an output signal of the sampling counter; at least one first read-only memory for storing data representing portions of predetermined impulse response waveforms which do not cause intersymbol interference, and for outputting the data in response to an address signal having a higher part constituted by an output signal of the selector and a lower part constituted by an output signal of the Exclusive-OR circuit; a second read-only memory for storing data representing portions of predetermined impulse response waveforms which do not cause intersymbol interference, and for outputting the data in response to an address signal having a higher part constituted by the (m+1)/2-th symbol signal outputted by the shift register and a lower part constituted by the output signal of the sampling counter; an adder for combining the data outputted by the first read-only memory and the second read-only memory; and a digital-to-analog converter for converting an output signal of the adder into a corresponding analog signal.

In the generalized Nyquist filter, "m" is equal to (a given symbol number ×2)+1 and the number of the selectors is equal to (m−1)/2, and the number of the first read-only memories is equal to the number of the selectors.

DESCRIPTION OF THE SECOND PREFERRED EMBODIMENT

Figure 7:
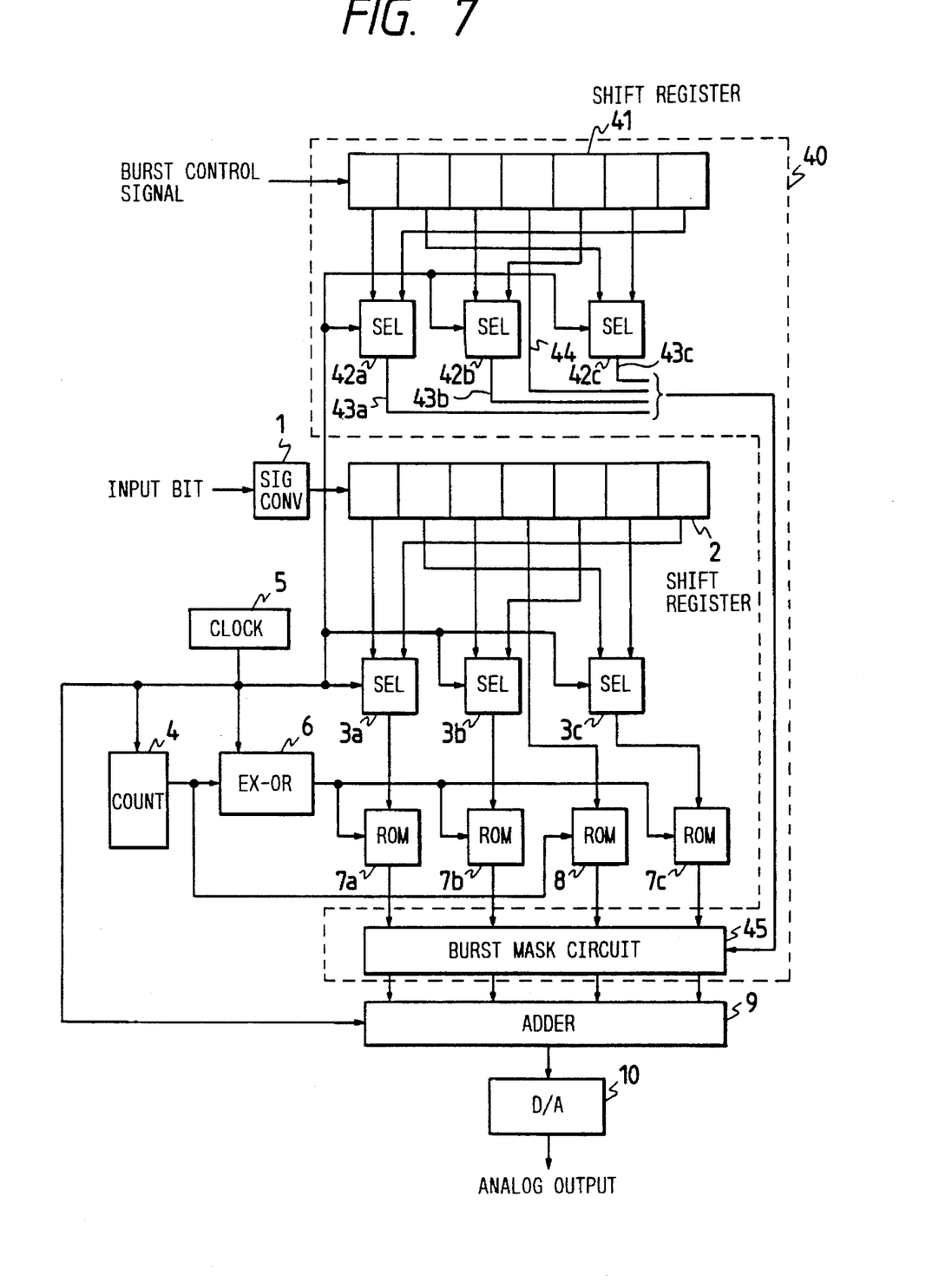
FIG. 7 is a block diagram of a Nyquist filter for digital modulation according to a second embodiment of this invention.

FIG. 7 shows a second embodiment of this invention which is similar to the embodiment of FIGS. 3–6 except for an additional arrangement indicated hereinafter.

The embodiment of FIG. 7 includes a burst control circuit 40 for controlling the output signals of ROM's 7a, 7b, 7c, and 8 in response to a burst control signal. The burst control signal is binary, being changeable between "0" and "1". The burst control circuit 40 includes a shift register 41, selectors 42a, 42b, and 42c, and a burst mask circuit 45.

The shift register 41 has seven segments connected in cascade. Each of the segments of the shift register 41 has one bit. Successive bits of rise burst control signal are sequentially inputted and stored into the shift register 41 while being shifted through the segments of the shift register 41 one bit by one bit. The successive seven bits of the burst control signal are outputted in parallel from the respective segments of the shift register 41.

The selector 42a receives the output signals of the first and seventh segments of the shift register 41. The selector 42a selects one of the output signals of the first and seventh segments of the shift register 41 in response to a clock signal fed from a clock signal generator 5, and transmits the selected signal 43a to the burst mask circuit 45. The selector 42b receives the output signals of the third and fifth segments of the shift register 41. The selector 42b selects one of the output signals of the third and fifth segments of the shift register 41 in response to the clock signal fed from the clock signal generator 5, and tramsmits the selected signal 43b to the burst mask circuit 45. The selector 42c receives the output signals of the second and sixth segments of the shift register 41. The selector 42c selects one of the output signals of the second and sixth segments of the shift register 41 in response to the clock signal fed from the clock signal generator 5, and transmits the selected signal 43c to the burst mask circuit 45. The output signal 44 of the fourth (central) segment of the shift register 41 is directly applied to the burst mask circuit 45.

The burst mask circuit 45 receives the output signals of the ROM's 7a, 7b, 7c, and 8. The burst mask circuit 45 has four segments. The first segment of the burst mask circuit 45 masks the output signal of the ROM 7a in response to the output signal 43a of the selector 42a, and outputs a masking-resultant signal to an adder 9. The second segment of the burst mask circuit 45 masks the output signal of the ROM 7b in response to the output signal 43b of the selector 42b, and outputs a masking-resultant signal to the adder 9. The third segment of the burst mask circuit 45 masks the output signal of the ROM 8 in response to the output signal 44 of the fourth segment of the shift register 41, and outputs a masking-resultant signal to the adder 9. The fourth segment of the burst mask circuit 45 masks the output signal of the ROM 7c in response to the output signal 43c of the selector 42c, and outputs a masking-resultant signal to the adder 9. The masking-resultant signals are combined by the adder 9.

Figure 8:
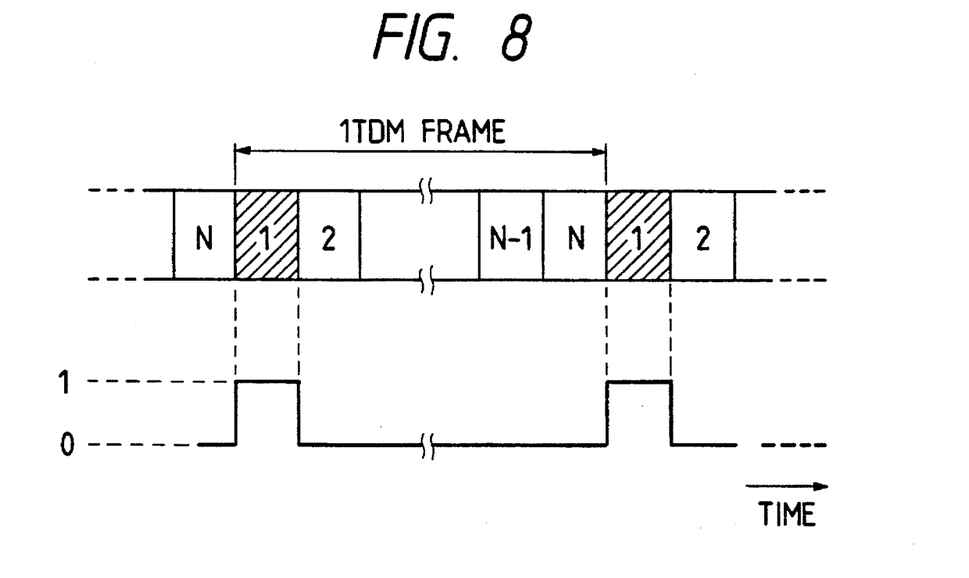
FIG. 8 is a time-domain diagram of a burst structure and a burst control signal in the Nyquist filter of FIG. 7.

The burst control circuit 40 operates as follows. The burst control signal is inputted into the shift register 41. The burst control signal is synchronous with an output symbol signal of a signal converter 1. As shown in FIG. 8, the burst control signal is synchronous with a specified burst (burst number 1 in the example of FIG. 8) of one TDM frae, and is "1" (a high level) only during the specified burst interval and is "0" (a low level) during other intervals. The burst control signal inputted into the shift register 41 is shifted one bit by one bit in synchronism with the shifting of the symbol signal in a shift register 2. The successive seven bits of the burst control signal are outputted from the respective segments of the shift register 41. The selector 42a selects one of the output signals of the first and seventh segments of the shift register 41 in response to the clock signal and in synchronism with the symbol signal selection by a selector 3a. The selector 42a transmits the selected signal 43a to the burst mask circuit 45. The selector 42b selects one of the output signals of the third and fifth segments of the shift register 41 in response to the clock signal and in synchronism with the symbol signal selection by a selector 3b. The selector 42b transmits the selected signal 43b to the burst mask circuit 45. The selector 42c selects one of the output signals of the second and sixth segments of the shift register 41 in response to the clock signal and in synchronism with the symbol signal selection by a selector 3c. The output signal 44 of the fourth (central) segment of the shift register 41 is directly applied to the burst mask circuit 45. The burst mask circuit 45 masks the output signal of the ROM 7a in response to the output signal 43a of the selector 42a, and outputs the masking-resultant signal to the adder 9. The burst mask circuit 45 masks the output signal of the ROM 7b in response to the output signal 43b of the selector 42b, and outputs the masking-resultant signal to the adder 9. The burst mask circuit 45 masks the output signal of the ROM 8 in response to the output signal 44 of the fourth segment of the shift register 41, and outputs the masking-resultant signal to the adder 9. The burst mask circuit 45 masks the output signal of the ROM 7c in response to the output signal 43c of the selector 42c, and outputs the masking-resultant signal to the adder 9. The masking-resultant signals are combined by the adder 9.

Figure 9:
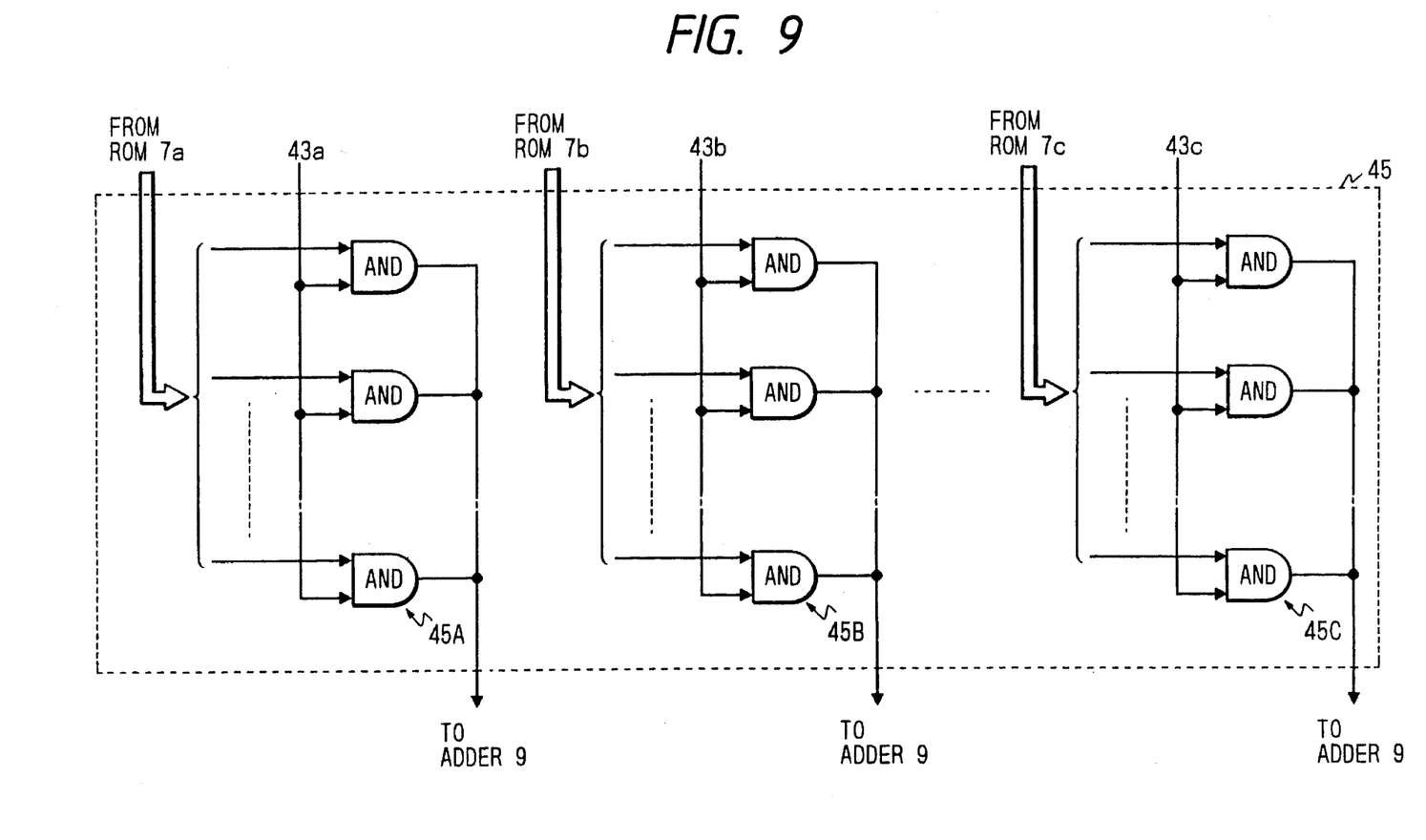
FIG. 9 is a block diagram of the burst mask circuit in the Nyquist filter of FIG. 7.

As shown in FIG. 9, the burst mask circuit 45A includes a first array 45A of AND gates having first input terminals subjected to the burst control signal 43a and second input terminals subjected to the respective bits of the, output signal of the ROM 7a. The first AND gate array 45A executes "AND" operation between the burst control signal 43a and the output signal of the ROM 7a, thereby masking the output signal of the ROM 7a in accordance with the burst control signal 43a. When the burst control signal 43a is "1", the output signal of the ROM 7a is transmitted to the adder 9 through the first AND gate array 45A as it is. When the burst control signal 43a is "0", the transmission of the output signal of the ROM 7a to the adder 9 is inhibited and instead a signal of "00 . . . 0" is fed to the adder 9. The burst mask circuit 45A includes a second array 45B of AND gates having first input terminals subjected to the burst control signal 43b and second input terminals subjected to the respective bits of the output signal of the ROM 7b. The second AND gate array 45B executes "AND" operation between the burst control signal 43b and the output signal of the ROM 7b, thereby masking the output signal of the ROM 7b in accordance with the burst control signal 43b. When the burst control signal 43b is "1", the output signal of the ROM 7b is transmitted to the adder 9 through the second AND gate array 45B as it is. When the burst control signal 43b is "0", the transmission of the output signal of the ROM 7b to the adder 9 is inhibited and instead a signal of "00 . . . 0" is fed to the adder 9. The burst mask circuit 45A includes a third array (not shown) of AND gates having first input terminals subjected to the burst control signal 44 and second input terminals subjected to the respective bits of the output signal of the ROM 8. The third AND gate array executes "AND" operation between the burst control signal 44 and the output signal of the ROM 8, thereby masking the output signal of the ROM 8 in accordance with the burst control signal 44. When the burst control signal 44 is "1", the output signal of the ROM 8 is transmitted to the adder 9 through the third AND gate array as it is. When the burst control signal 44 is "0", the transmission of the output signal of the ROM 8 to the adder 9 is inhibited and instead a signal of "00 . . . 0" is led to the adder 9. The burst mask circuit 45A includes a fourth array 45C of AND gates having first input terminals subjected to the burst control signal 43c and second input terminals subjected to the respective bits of the output signal of the ROM 7c. The fourth AND gate array 45C executes "AND" operation between the burst control signal 43c and the output signal of the ROM 7c, thereby masking the output signal of the ROM 7c in accordance with the burst control signal 43c. When the burst control signal 43c is "1", the output signal of the ROM 7c is transmitted to the adder 9 through the third AND gate array 45C as it is, When the burst control signal 43c is "0", the transmission of the output signal of the ROM 7c to the adder 9 is inhibited and instead a signal of "00 . . . 0" is fed to the adder 9.

Generalizing this embodiment results in the following design. A generalized Nyquist filter for digital modulation has an arrangement in addition to the feature of the generalized Nyquist filter of the first embodiment which includes a burst control shift register synchronized with the shift register for storing successive "m" bits of a burst control signal, for shifting the bits of the burst control signal one bit by one bit, and for outputting the "m" bits of the burst control signal in parallel; at least one burst control selector for sequentially selecting one of the k-th bit and the (m+1)−k-th bit of the burst control signal outputted by the burst control shift register in response to the clock signal; and a burst mask circuit for masking the output data of the first read-only memory and the second read-only memory in accordance with an output signal of the burst control selector and the (m+1)/2-th bit of the burst control signal outputted by the burst control shift register.

DESCRIPTION OF THE THIRD PREFERRED EMBODIMENT

Figure 10:
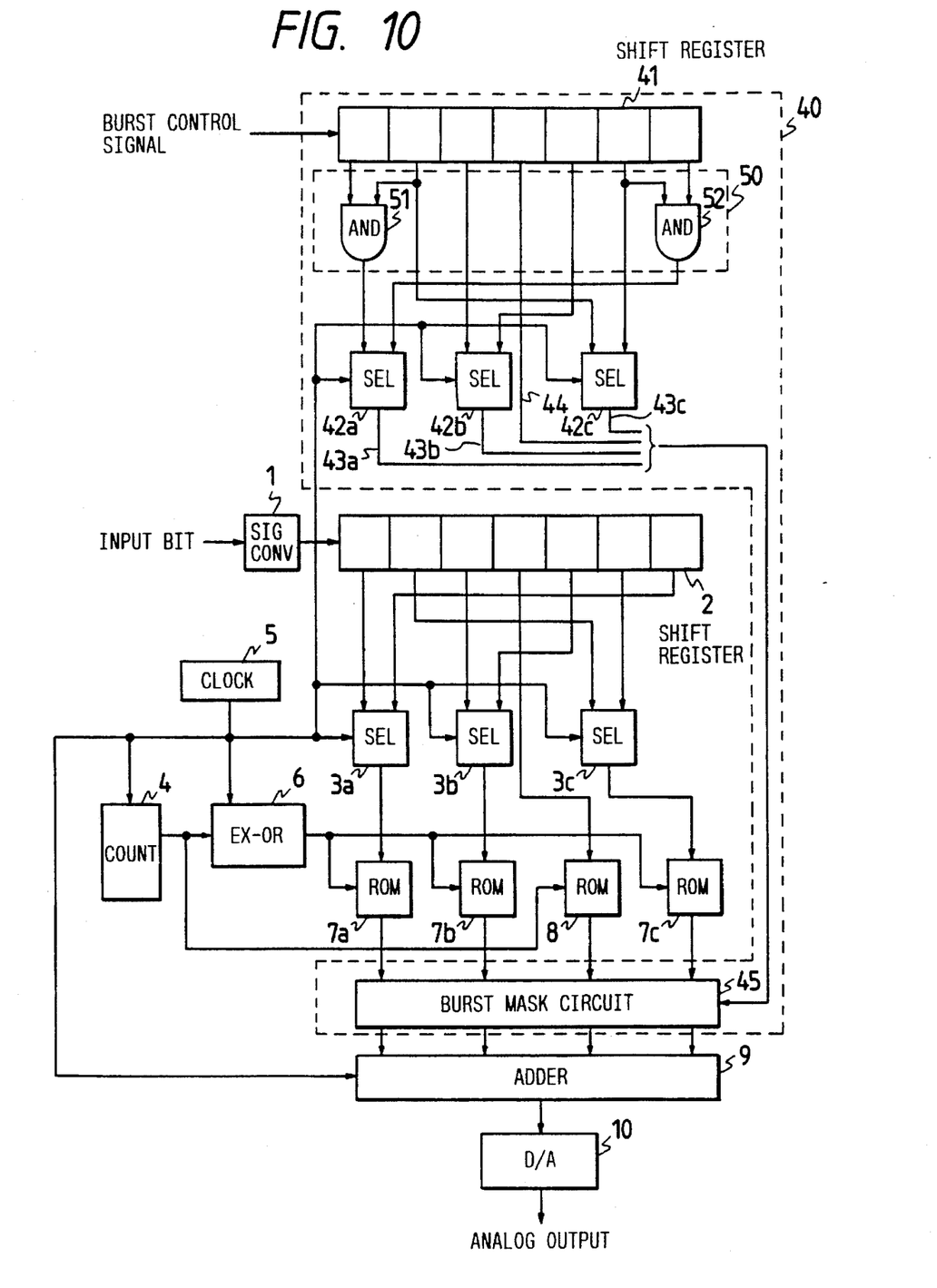
FIG. 10 is a block diagram of a Nyquist filter for digital modulation according to a third embodiment of this invention.

FIG. 10 shows a third embodiment of this invention which is similar to the embodiment of FIGS. 7–9 except for an additional arrangement indicated hereinafter.

The embodiment of FIG. 10 includes a second burst control circuit or a burst rising/falling control circuit 50 having two AND gates 51 and 52. A first input terminal of the AND gate 51 receives the output signal of the first segment of a shift register 41. A second input terminal of the AND gate 51 receives the output signal of the second segment of the shift register 41. The AND gate 51 executes "AND" operation between the output signal of the first segment of the shift register 41 and the output signal of the second segment of the shift register 41. The output signal of the AND gate 51 is fed to a selector 42a. A first input terminal of the AND gate 52 receives the output signal of the sixth segment of the shift register 41. A second input terminal of the AND gate 52 receives the output signal of the seventh segment of the shift register 41. The AND gate 52 executes "AND" operation between the output signal of the sixth segment of the shift register 41 and the output signal of the seventh segment of the shift register 41. The output signal of the AND gate 52 is fed to the selector 42a. The selector 42a selects one of the output signals of the AND gates 51 and 52 in response to a clock signal fed from a clock signal generator 5, and transmits the selected signal 43a to a burst mask circuit 45.

A description will now be given of control of a rising edge of a burst in connection with operation of the second burst control circuit 50. When a burst control signal bit of "1" is inputted into the first segment of the shift register 41, the 7-bit burst control signal outputted from the shift register 41 assumes a state of "1000000". The AND gate 51 in the second burst control circuit 50 executes "AND" operation between the first bit "1" and the second bit "0" of the 7-bit burst control signal, and thereby changes the 7-bit burst control signal into a new 7-bit burst control signal of "0000000". The 7-bit burst control signal "0000000" is transmitted to the burst mask circuit 45 via selectors 42a, 42b, and 42c. The burst mask circuit 45 inhibits the transmission of the output signals of ROM's 7a, 7b, 7c, and 8 to an adder 9, and instead feeds signals of "00 . . . 0 to the adder 9 in response to the 7-bit burst control signal "00000000".

When burst control signal bits of "1" are inputted into the first and second segments of the shift register 41, the 7-bit burst control signal outputted from the shift register 41 assumes a state of "1100000". The AND gate 51 in the second burst control circuit 50 executes "AND" operation between the first bit "1" and the second bit "1" of the 7-bit burst control signal, and thereby the 7-bit burst control signal remains in the state of "1100000". The 7-bit burst control signal "1100000" is transmitted to the burst mask circuit 45 via the selectors 42a, 42b, and 42c. The burst mask circuit 45 permits the transmission of the output signal of the ROM 7a to the adder 9 in response to the first bit "1" of the burst control signal. In addition, the burst mask circuit 45 permits the transmission of the output signal of the ROM 7c to the adder 9 in response to the second bit "1" of the burst control signal.

As understood from the previous description, during a period of a rising edge of a burst, when a burst control signal bit of "1" is inputted into the second segment of the shift register 41, a D/A converter 10 starts to output an effective (non-zero) analog signal. Thus, the rising time of the burst is limited to an interval corresponding to two symbols.

A description will now be given of control of a falling edge of a burst in connection with operation of the second burst control circuit 50. When burst control signal bits of "1" are inputted into the sixth and seventh segments of the shift register 41, the 7-bit burst control signal outputted from the shift register 41 assumes a state of "0000011". The AND gate 52 in the second burst control circuit 50 executes "AND" operation between the sixth bit "1" and the seventh bit "1" of the 7-bit burst control signal, and thereby the 7-bit burst control signal remains in the state of "0000011". The 7-bit burst control signal "0000011" is transmitted to the burst mask circuit 45 via the selectors 42a, 42b, and 42c. The burst mask circuit 45 permits the transmission of the output signal of the ROM 7c to the adder 9 in response to the sixth bit "1" of the burst control signal. In addition, the burst mask circuit 45 permits the transmission of the output signal of the ROM 7a to the adder 9 in response to the seventh bit "1" of the burst control signal.

When a burst control signal bit of "0" is inputted into the sixth segment of the shift register 41, the 7-bit burst control signal outputted from the shift register 41 changes to a state of "0000001". The AND gate 52 in the second burst control circuit 50 executes "AND" operation between the sixth bit "0" and the seventh bit "1" of the 7-bit burst control signal, and thereby changes the 7-bit burst control signal into a new 7-bit burst control signal of "0000000". The 7-bit burst control signal "0000000" is transmitted to the burst mask circuit 45 via the selectors 42a, 42b, and 42c. The burst mask circuit 45 inhibits the transmission of the output signals of the ROM's 7a, 7b, 7c, and 8 to the adder 9, and instead feeds signals of "00 . . . 0 to the adder 9 in response to the 7-bit burst control signal "0000000".

As understood from the previous description, during a period of a falling edge of a burst, when a burst control signal bit of "0" is inputted into the sixth segment of the shift register 41, a D/A converter 10 stops outputting an effective (non-zero) analog signal. Thus, the falling time of the burst is limited to an interval corresponding to two symbols.

Generalizing This embodiment results in the following design. A generalized Nyquist filter for digital modulation has an arrangement in addition to the feature of the generalized Nyquist filter of the second embodiment which includes a burst rising/falling control circuit connected between the burst control shift register and the burst control selector, the burst rising/falling control circuit including at least one first AND gate for executing AND operation between the 1-st to the (j−1)-th bits and the j-th bit of the burst control signal outputted by the burst control shift register, where "j" denotes a given natural number and satisfies "1<j≦(m+1)/2"; means for using an output signal of the first AND gate as new 1-st to (j−1)-th bits of the burst control signal; at least one second AND gate for executing AND operation between the {(m+2)−j}-th to the m-th bits and the {(m+1)−j}-th bit of the burst control signal outputted by the burst control shift register, where "j" denotes a given natural number and satisfies "1<j≦(m+1)/2"; and means for using an output signal of the second AND gate as new {(m+2)−j}-th to m-th bits of the burst control signal.

DESCRIPTION OF THE FOURTH PREFERRED EMBODIMENT

Figure 11:
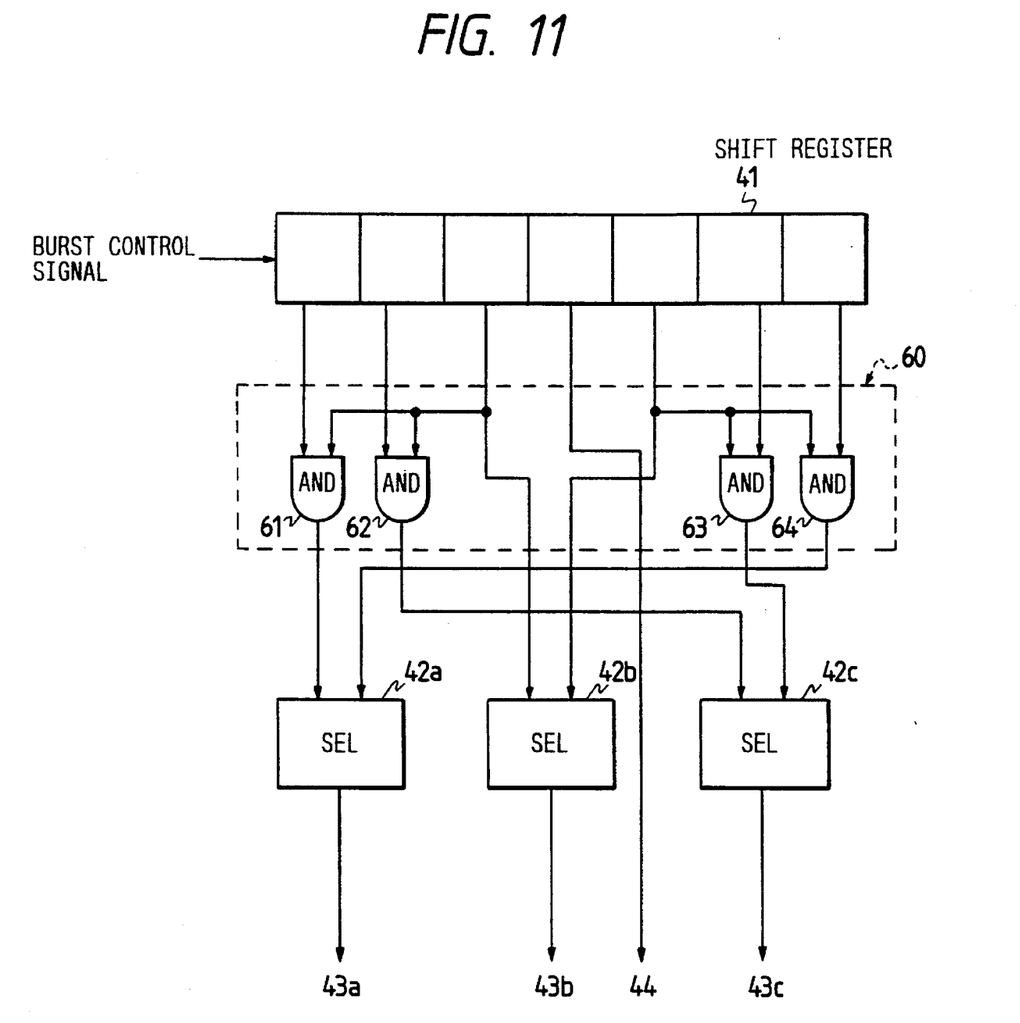
FIG. 11 is a block diagram of a part of a Nyquist filter for digital modulation according to a fourth embodiment of this invention.

FIG. 11 shows a fourth embodiment of this invention which is similar to the embodiment of FIG. 10 except that the burst rising/falling control circuit 50 (see FIG. 10) is replaced by a burst rising/falling control circuit 60.

As shown in FIG. 11, the burst rising/falling control circuit 60 includes four AND gates 61, 62, 63, and 64. A first input terminal of the AND gate 61 receives the output signal of the first segment of a shift register 41. A second input terminal of the AND gate 61 receives the output signal of the third segment of the shift register 41. The AND gate 61 executes "AND" operation between the output signal of the first segment of the shift register 41 and the output signal of the third segment of the shift register 41. The output signal of the AND gate 61 is fed to a selector 42a. A first input terminal of the AND gate 62 receives the output signal of the second segment of the shift register 41. A second input terminal of the AND gate 62 receives the output signal of the third segment of the shift register 41. The AND gate 62 executes "AND" operation between the output signal of the second segment of the shift register 41 and the output signal of the third segment of the shift register 41. The output signal of the AND gate 62 is fed to a selector 42c. A first input terminal of the AND gate 63 receives the output signal of the fifth segment of the shift register 41. A second input terminal of the AND gate 63 receives the output signal of the sixth segment of the shift register 41. The AND gate 63 executes "AND" operation between the output signal of the fifth segment of the shift register 41 and the output signal of the sixth segment of the shift register 41. The output signal of the AND gate 63 is fed to the selector 42c. A first input terminal of the AND gate 64 receives the output signal of the fifth segment of the shift register 41. A second input terminal of the AND gate 64 receives the output signal of the seventh segment of the shift register 41. The AND gate 64 executes "AND" operation between the output signal of the fifth segment of the shift register 41 and the output signal of the seventh segment of the shift register 41. The output signal of the AND gate 64 is fed to the selector 42a. The selector 42a selects one of the output signals of the AND gates 61 and 64 in response to a clock signal fed from a clock signal generator 5, and transmits the selected signal 43a to a burst mask circuit 45. The selector 42c selects one of the output signals of the AND gates 62 and 63 in response to the clock signal fed from the clock signal generator 5, and transmits the selected signal 43c to the burst mask circuit 45.

In this embodiment, the falling time of the burst and also the rising time of the burst are limited to an interval corresponding to one symbol.

What is claimed is:

1. A Nyquist filter for digital modulation, comprising:

a signal converter for converting an input bit sequence into n-bit parallel symbol signals each representing one symbol, where "n" denotes a given natural number;

a shift register connected to the signal converter for storing an "m" number of the n-bit parallel symbol signals, for shifting the n-bit parallel symbol signals one symbol by one symbol, and for outputting the n-bit parallel symbol signals, where "m" denotes a given odd natural number equal to or greater than 3;

a clock signal generator for generating a clock signal having a given frequency;

at least one selector for sequentially selecting one of the k-th symbol signal and the (m+1)−k-th symbol signal outputted by the shift register in response to the clock signal, where k equals 1, 2, . . . , (m−1)/2;

a sampling counter for counting pairs of successive clock pulses of the clock signal;

an Exclusive-OR circuit for executing Exclusive-OR operation between the clock signal and an output signal of the sampling counter;

at least one first read-only memory for storing first data representing first portions of predetermined impulse response waveforms which do not cause intersymbol interference, and for outputting the first data in response to an address signal having a higher part constituted by an output signal of the selector and a lower part constituted by an output signal of the Exclusive-OR circuit, wherein the predetermined impulse response waveforms have second portions and central portions different from the first portions thereof, and the first portions and the second portions of the predetermined impulse response waveforms are symmetrical with respect to the central portions thereof;

a second read-only memory for storing second data representing the central portions of the predetermined impulse response waveforms which do not cause intersymbol interference, and for outputting the second data in response to an address signal having a higher part constituted by the $(m+1)/2$-th symbol signal outputted by the shift register and a lower part constituted by the output signal of the sampling counter;

an adder for combining the first data outputted by the first read-only memory and the second data output by the second read-only memory; and a digital-to-analog converter for converting an output signal of the adder into a corresponding analog signal, wherein each of said first portions of the predetermined impulse response waveforms which are represented by the first data stored in the first read-only memory corresponds to one symbol, and each of said central portions of the predetermined impulse response waveforms which are represented by the second data stored in the second read-only memory corresponds to another symbol.

2. A Nyquist filter for digital modulation, comprising:

a signal converter for converting an input bit sequence into n-bit parallel symbol signals each representing one symbol, where "n" denotes a given natural number;

a shift register connected to the signal converter for storing an "m" number of the n-bit parallel symbol signals, for shifting the n-bit parallel symbol signals one symbol by one symbol, and for outputting the n-bit parallel symbol signals, where "m" denotes a given odd natural number equal to or greater than 3;

a clock signal generator for generating a clock signal having a given frequency;

at least one selector for sequentially selecting one of the k-th symbol signal and the $(m+1)-k$-th symbol signal outputted by the shift register in response to the clock signal, where k equals $1, 2, \ldots, (m-1)/2$;

a sampling counter for counting pairs of successive clock pulses of the clock signal;

an Exclusive-OR circuit for executing Exclusive-OR operation between the clock signal and an output signal of the sampling counter;

at least one first read-only memory for storing first data representing first portions of predetermined impulse response waveforms which do not cause intersymbol interference, and for outputting the first data in response to an address signal having a higher part constituted by an output signal of the selector and a lower part constituted by an output signal of the Exclusive-OR circuit, wherein the predetermined impulse response waveforms have second portions and central portions different from the first portions thereof, and the first portions and the second portions of the predetermined impulse response waveforms are symmetrical with respect to the central portions thereof;

a second read-only memory for storing second data representing the central portions of the predetermined impulse response waveforms which do not cause intersymbol interference, and for outputting the second data in response to an address signal having a higher part constituted by the $(m+1)/2$-th symbol signal outputted by the shift register and a lower part constituted by the output signal of the sampling counter;

an adder for combining the first data outputted by the first read-only memory and the second data output by the second read-only memory; and a digital-to-analog converter for converting an output signal of the adder into a corresponding analog signal, wherein "m" is equal to (a given symbol number $\times 2)+1$, the number of the selectors is equal to $(m-1)/2$, and the number of the first read-only memories is equal to the number of the selectors.

3. A Nyquist filter for digital modulation, comprising:

a signal converter for converting an input bit sequence into n-bit parallel symbol signals each representing one symbol, where "n" denotes a given natural number;

a shift register connected to the signal converter for storing an "m" number of the n-bit parallel symbol signals for shifting the n-bit parallel symbol signals one symbol by one symbol, and for outputting the n-bit parallel symbol signals, where "m" denotes a given odd natural number equal to or greater than 3;

a clock signal generator for generating a clock signal having a given frequency;

at least one selector for sequentially selecting one of the k-th symbol signal and the $(m+1)-k$-th symbol signal outputted by the shift register in response to the clock signal, where k equals $1, 2, \ldots, (m-1)/2$;

a sampling counter for counting pairs of successive clock pulses of the clock signal an Exclusive-OR circuit for executing Exclusive-OR operation between the clock signal and an output signal of the sampling counter;

at least one first read-only memory for storing data representing portions of predetermined impulse response waveforms which do not cause intersymbol interference, and for outputting the data in response to an address signal having a higher part constituted by an output signal of the selector and a lower part constituted by an output signal of the Exclusive-OR circuit;

a second read-only memory for storing data representing portions of predetermined impulse response waveforms which do not cause intersymbol interference, and for outputting the data in response to an address signal having a higher part constituted by the $(m+1)/2$-th symbol signal outputted by the shift register and a lower part constituted by the output signal of the sampling counter;

an adder for combining the data outputted by the first read-only memory and the second read-only memory;

a digital-to-analog converter for converting an output signal of the adder into a corresponding analog signal;

a burst control shift register synchronized with the shift register for storing successive "m" bits of a burst control signal, for shifting the bits of the burst control signal one bit by one bit, and for outputting the "m" bits of the burst control signal in parallel;

at least one burst control selector for sequentially selecting one of the k-th bit and the (m+1)–k-th bit of the burst control signal outputted by the burst control shift register in response to the clock signal; and a burst mask circuit for masking the output data of the first read-only memory and the second read-only memory in accordance with an output signal of the burst control selector and the (m+1)/2-th bit of the burst control signal outputted by the burst control shift register.

4. The Nyquist filter of claim 3, further comprising a burst rising/falling control circuit which is connected between the burst control shift register and the burst control selector and which includes:

at least one first AND gate for executing AND operation between the 1-st to the (j–1)-th bits and the j-th bit of the burst control signal outputted by the burst control shift register, where "j" denotes a given natural number and satisfies "1<j≦(m+1)/2";

means for using an output signal of the first AND gate as new 1-st to (j–1)-th bits of the burst control signal;

at least one second AND gate for executing AND operation between the {(m+2)–j}-th to the m-th bits and the {(m+1)–j}-th bit of the burst control signal outputted by the burst control shift register, where "j" denotes a given natural number and satisfies "1<j≦(m+1)/2"; and means for using an output signal of the second AND gate as new {(m+2)–j}-th to m-th bits of the burst control signal.

5. A Nyquist filter for digital modulation, comprising:

a first ROM for storing data representing first portions of predetermined impulse response waveforms which do not cause intersymbol interference, wherein the predetermined impulse response waveforms have second portions and central portions different from the first portions thereof, and the first portions and the second portions of the predetermined impulse response waveforms are symmetrical with respect to the central portions thereof;

a second ROM for storing data representing the central portions of the predetermined impulse response waveforms;

first means for accessing the first ROM and the second ROM to read out the data from the first ROM and the second ROM in response to an input signal, and for generating first data according to the data read out from the first ROM and the second ROM, the first data representing first and central portions of impulse response waveforms corresponding to the input signal;

second means for accessing the first ROM to read out the data from the first ROM in response to the input signal, for generating second data on the basis of the data read out from the first ROM, the second data representing second portions of impulse response waveforms corresponding to the input signal; and means for combining the first data generated by the first means and the second data generated by the second means, wherein each of said first portions of the predetermined impulse response waveforms corresponds to one symbol of the input signal, add each of said central portions of the predetermined impulse response waveforms corresponds to another symbol of the input signal.

* * * * *